United States Patent [19]

Nishimura

[11] Patent Number: 4,742,546

[45] Date of Patent: May 3, 1988

[54] PRIVACY COMMUNICATION METHOD AND PRIVACY COMMUNICATION APPARATUS EMPLOYING THE SAME

[76] Inventor: Satoshi Nishimura, 83 Ozakikita-machi 1-chome, Kagamigahara-shi, Gifu-ken, Japan, 504

[21] Appl. No.: 532,195

[22] Filed: Sep. 14, 1983

[30] Foreign Application Priority Data

| | | | |
|---|---|---|---|
| Sep. 20, 1982 | [JP] | Japan | 57-164763 |
| May 20, 1983 | [JP] | Japan | 58-89500 |
| Jun. 20, 1983 | [JP] | Japan | 58-111325 |

[51] Int. Cl.[4] .......... H04L 9/00

[52] U.S. Cl. .......... 380/35; 380/28

[58] Field of Search .......... 179/1.5 R, 1.5 FS, 1.58; 388/316; 364/900; 370/109; 381/34; 455/72; 380/28, 35, 36

[56] References Cited

U.S. PATENT DOCUMENTS

| | | | |
|---|---|---|---|
| 3,202,764 | 8/1965 | Adams et al. | 179/1.5 FS |
| 3,676,862 | 7/1972 | Sasabe | 370/109 |
| 4,302,628 | 11/1981 | Akrich et al. | 179/1.5 S |
| 4,378,593 | 3/1983 | Yamamoto | 364/900 |
| 4,392,021 | 7/1983 | Slate | 179/1.5 R |
| 4,435,832 | 3/1984 | Asada et al. | 381/34 |
| 4,499,503 | 2/1985 | Suzuki | 358/316 |

*Primary Examiner*—Salvatore Cangialosi
*Assistant Examiner*—Aaron J. Lewis
*Attorney, Agent, or Firm*—Darby & Darby

[57] ABSTRACT

A privacy communication system in which signals transmitted from a transmitter are subjected to time base compression and expansion while the received signal is subjected to time base expansion and compression in synchronism with the expansion and compression occurring at the transmitter. The clock frequency of the clock in the transmitting and receiving ends are changed in the synchronism according to a predetermined algorithem.

9 Claims, 10 Drawing Sheets

30

PRIVACY COMMUNICATION METHOD AND PRIVACY COMMUNICATION APPARATUS EMPLOYING THE SAME

BACKGROUND OF THE INVENTION

1. Field of the Invention

The present invention relates to a privacy communication method and a privacy communication apparatus employing the same. More specifically, the present invention relates to a privacy communication method and a privacy communication apparatus employing the same adapted for communication in a wire manner or a wireless manner upon processing of a signal for maintenance of privacy.

2. Description of the Prior Art

A problem arises in wire communication or wireless communication that a transmitted signal can be received by anyone by the use of a receiving apparatus suited for that purpose. Therefore, a so-called a privacy communication system has been put into practical use in which a transmitted signal is processed in a specific manner so that the signal may not be understood by a person having a general purpose receiver, even if received, while the transmitted signal is received by a specified receiver having a reproducing means for reproducing the above described processed signal.

As such a privacy communication system, a frequency inversion system, a frequency splitting and inversion system, and the like have been conventionally well-known and widely used.

Figs. 1A and 1B are views for explaining a frequency inversion system taken by way of an example of a conventional privacy communication system and FIGS. 2A and 2B are views for explaining a frequency splitting and inversion system taken by way of another example of a conventional wireless privacy communication system.

Referring to Figs. 1A and 1B, the frequency inversion system is adapted such that a carrier wave is modulated with a voice signal to be transmitted and a voice frequency spectrum is inverted by adopting a difference component between the carrier wave frequency and the voice signal frequency, whereupon the same is transmitted, while the reversed processing is applied on the part of a receiver to restore a received signal of a normal voice frequency spectrum. For example, a carrier wave of 3,250 Hz is modulated by a voice signal with a normal voice frequency spectrum of 250 to 3,000 Hz, as shown in FIG. 1A, whereupon a difference between the carrier wave frequency and the voice signal frequency is evaluated to provide a voice frequency spectrum, as frequency inverted, such that 250 Hz is inverted to 3,000 Hz and 3,000 Hz is inverted to 250 Hz. On the other hand, on the side of a receiver, conversely a carrier wave of 3,250 Hz is modulated by the received signal with the voice frequency spectrum as frequency inverted such that 250 Hz is converted to 3,000 Hz and 3,000 Hz is inverted to 250 Hz, as shown in FIG. 1B, whereby a proper voice frequency spectrum of 250 to 3,000 Hz is restored. However, of late, most of communications have been changed from a double-side band communication system to a single-side band communication system and a privacy communication system of frequency inversion has been becoming more valueless.

By contrast, a frequency splitting and inversion system is adapted such that, as shown in FIGS. 2A and 2B, a communication band is split into a plurality of sub-bands by means of a plurality of band filters, whereupon frequency inversion is independently made in each of the bands or rearrangement of the frequency positions is made among the sub-bands, whereupon the signal is transmitted. Referring to the FIG. 2A, the communication band of 250 to 3,000 Hz is equally divided into five sub-bands A, B, C, D and E by means of band filters of a band width of approximately 550 Hz, whereupon the sub-bands A and C is frequency inverted while the sub-bands B, D and E are rearranged. In such a case, possible different combinations of the sub-bands could be $2^5 \times {}_5P_5 = 32 \times 5! = 3{,}840$. The above described system is used in wireless communication using a short wave as the A4 privacy communication system; however, disadvantages are involved that the circuit construction becomes extremely complicated and the system becomes large scaled.

SUMMARY OF THE INVENTION

Briefly described, the present invention is adapted such that a signal to be transmitted from a transmitter end is alternately subjected to compression and expansion in terms of the time base, whereupon the signal is transmitted, while the received signal is alternately subjected to expansion and compression in terms of the time base in synchronism with the compression and expansion on the part of the transmitter end, thereby to restore the original signal.

According to the present invention, since the signal to be transmitted is compressed and expanded in terms of the time base thereof, only a receiving system capable of expanding and compressing the received signal in terms of the time base in synchronism with those of the transmitter end can restore the original signal, whereby the signal can be prevented from being tapped by any others.

In a preferred embodiment of the present invention, the transmitter and the receiver each comprise a variable delay circuit of a voice signal which is clock controllable, so that compression and expansion of the time base of a voice signal are made on the part of the transmitter end through a time dependent change of a frequency of the clock pulse and expansion and compression of the time base of the signal received by the receiver which are complimentary to those on the part of the transmitter end are performed on the part of the receiver end through a time dependent change of the frequency of the clock pulse. A circuit arrangement capable of variably controlling the delay time in response to the clock pulse may comprise a storage circuit for receiving and providing a voice signal in response to the clock pulse and specifically may comprise a shift register of such as a bucket brigade device for sampling a voice signal in response to a single clock pulse, for simultaneously transferring the previously sampled value succession and for providing the sampled value to an output terminal or a random-access memory for receiving and providing a sampled value of a voice signal in response to an input clock and an output clock. In case of any type of storage circuit, by adapting the clock frequencies on the part of the transmitter end and the receiver end so that the frequency of the sampling clock for use in entry of a voice signal in a variable delay circuit on the part of the transmitter end may be equal to the frequency of the clock for use in deriving the stored signal from a variable delay circuit on the part of the receiver end after the signal stored at the variable delay circuit on the part of the transmitter end goes out from such delay circuit and enters into the variable delay circuit on the part of the receiver end, the frequency structure of the voice signal in communication can be completely restored without distortion through these circuits. In such a state in which the voice signal sampled and stored in the variable delay circuit on the part of the transmitter in response to the input clock frequency goes out in response to the output clock frequency different from the input clock frequency and the same is transferred along the communication path, the time base of the voice signal has already been compressed or expanded with the ratio of these input and output clock frequencies and, if and when the said ratio is of an adequately large value, the information can not be understood as a voice even if the same is received by a third party.

Therefore, according to the preferred embodiment of the present invention, a relatively simple combination of such circuits as the storage means, the variable clock pulse generating means and the like can provide a privacy communication apparatus of a high performance, of a less expensive cost and of high utility.

Meanwhile, the transmitter end and the receiver end in a communication system may each comprise storage means for sampling and storing the signal in succession in response to a clock pulse and for providing the same, cyclic clock generating means for cyclically generating the clock pulse to control the storage means by the clock pulse and having the frequency of f (t), where t is the time, for both of the transmitter and receiver end, and synchronizing means for synchronizing the clock generating means of the transmitter end with that of the receiver ends. Assuming that the storage capacity of the transmission signal storage means is M (an integer) and the storage capacity of the reception signal storage means is N (an integer), by adopting a time function such that f $(t_i)$ is always equal to f $(t_{i+M+N})$ for the arbitrary sampling time $(t_i)$, where i is an integer, and f $(t_i)$ is not always equal to f $(t_{i+M})$, the frequency of the signal to be transmitted is converted for transmission on the transmission system from the transmitter end and the frequency of the received signal at the receiver end is converted comlementarily, whereby a signal free from the frequency change can be reproduced as a whole of transmission and reception.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
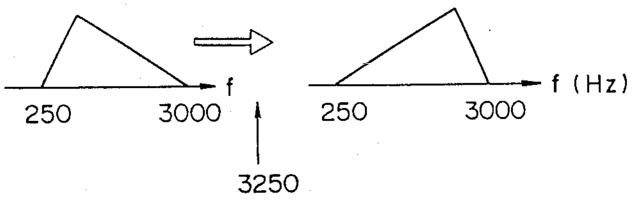
FIGS. 1A and 1B are views for explaining a frequency inversion system taken by way of an example of a conventional wireless privacy communication system.
Figure 1B:
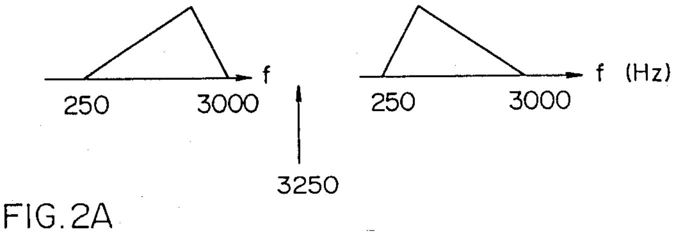
Figure 2A:
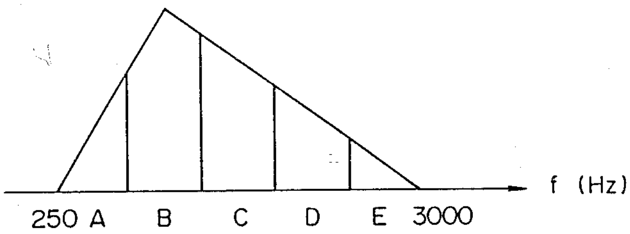
FIGS. 2A and 2B are views for explaining a frequency splitting and inversion system taken by way of another example of a conventional wireless privacy communication system.
Figure 2B:
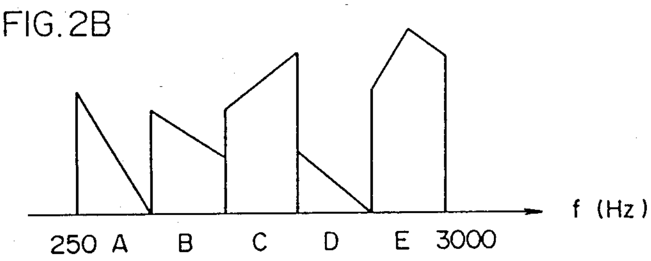
Figure 3A:
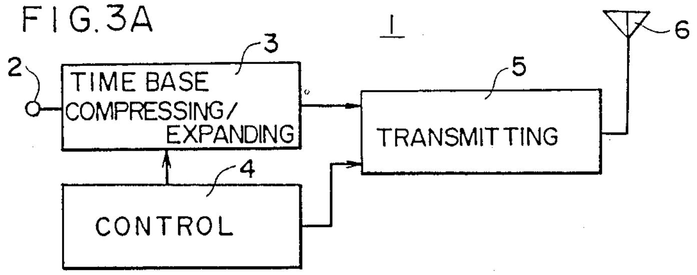
FIG. 3A is a block diagram showing an outline of a transmitter included in one embodiment of the present invention.
Figure 3B:
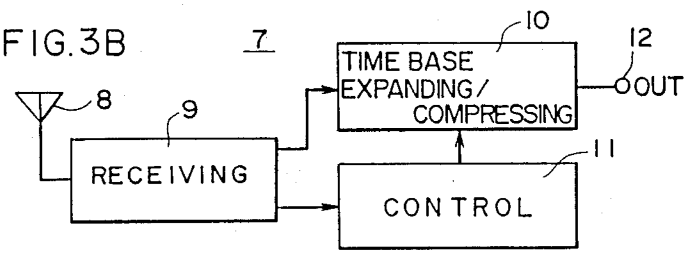
FIG. 3B is a block diagram showing an outline of a receiver included in one embodiment of the present invention.
Figure 4:
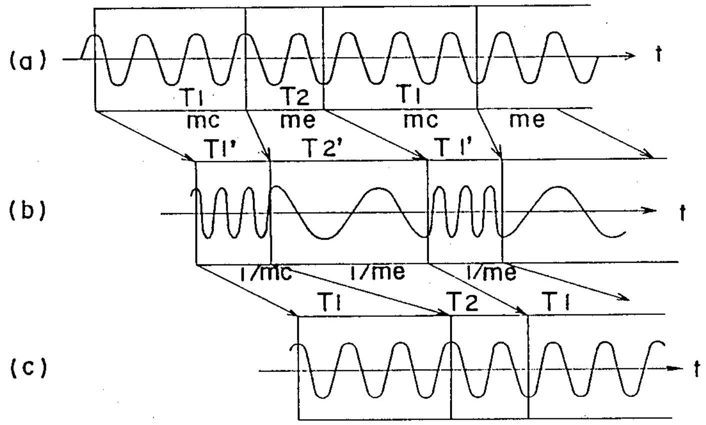
FIG. 4 is a graph showing waveforms for explaining the principle of one embodiment of the present invention.

FIG. 3A is a block diagram showing an outline of a transmitter included in one embodiment of the present invention, FIG. 3B is a block diagram showing an outline of a receiver included in one embodiment of the present invention, and FIG. 4 is a graph showing waveforms for explaining the principle of one embodiment of the present invention.

A voice signal to be transmitted is applied to an input terminal 2 of a transmitter 1 shown in FIG. 3A. The voice signal is supplied to a time base compressing/expanding circuit 3, whereby the signal is alternately subjected to compression and expansion in terms of the time base, i.e., frequency conversion is performed. The output from the time base compressing/expanding circuit 3 is transmitted through a transmitting circuit 5 including a modulating circuit and a power amplifying circuit from a transmitting antenna 6. The time base compressing/expanding circuit 3 comprises a variable delay circuit the delay time of which is externally controllable and is adapted to compress/expand the time base of a signal passing through the variable delay circuit at an appropriate time period by changing a signal delay time at an appropriate time interval by means of a control circuit 4. Meanwhile, a control signal (a synchronizing signal) of the control circuit 4 for controlling the time base compressing/expanding circuit 3 is transmitted in superposition on a signal to be transmitted.

On the other hand, in the receiver 7 shown in FIG. 3B, a received signal is supplied to a receiving circuit 9 through a receiving antenna 8. The receiving circuit 9 comprises an amplifying circuit and a demodulating circuit and serves to demodulate the received signal and at the same time to separate the above described control signal. The demodulated voice signal is then supplied to a time base compressing/expanding circuit 10, whereby the same is subjected to expansion and compression in terms of the time base, as complementary to those of transmitting signal. As a result, a voice signal of the same frequency structure as that of the original input signal is restored and is obtained from an output terminal 12. The time base compressing/expanding circuit 10 of the receiver 7 may comprise a variable delay circuit of the same structure as that of the transmitter end.

In such a case, the frequencies of the clock pulses of the clock generating circuits 4 and 11 for controlling these variable delay circuits are selected such that the clock change, i.e. the time function f (t) of the clock frequency may be the following equation (1):

$$f(t)=f(t+\tau 1+\tau 2) \quad (1)$$

where the delay times of the variable delay circuits at the transmitter and receiver ends are assumed to be $\tau 1$ and $\rho 2$. The clock frequency by which the voice signal is sampled at the transmitter end and the clock frequency by which the received signal is provided at the receiver end become equal to each other and reception is made of the input voice signal as if there is apparently no change of the time base even if any time dependent processing is done inside these variable delay circuits.

Specifically, in the case where the variable delay circuits 3 and 10 comprise a bucket brigade device for sampling a voice signal in response to the clock pulse and for transferring the sampled signal successively, the clock frequency f $(t_i)$ (where i is an integer changeable in the order of the sampling points and $t_i$ is a sampling time) of the clock generating circuits 4 and 11 is determined to satisfy the following equations (2) and (3):

$$f(t_i)=f(t_{i+M+N}) \quad (2)$$

$$f(t_i)\neq f(t_{i+M}) \quad (3)$$

assuming that the storage capacity of the bucket brigade device 3 on the part of the transmitter end is M and the storage capacity of the bucket brigade device 10 on the part of the receiver end is N. Referring to the above described equation (3), "$\neq$" means "is not always equal to". The equation (2) defines the condition in which the voice signal is restored through transmission and reception and the equation (3) defines the condition in which the voice signal is transmitted in privacy state in a communication path constituting the transmission system. Although a large number of time functions satisfying such clock condition may be considered, in specifically considering simplicity for generation by the electric circuit, a triangle function, a sine wave function, a rectangular wave function and like are actually used as f (t).

Assuming that f (t) is a rectangular wave, i.e. the two frequencies f1 and f2 are exchanged, the voice signal supplied to the input terminal 2 as shown as (a) in FIG. 4 undergoes for example alternate expansion of the time base by mc times and me times as shown as (b) in FIG. 4. As a result of it frequency of the voice at the portion of the time length (T1) is changed by 1/mc times and the frequency of the voice at the portion of the time length (T2) is changed by 1/me times.

Now it is assumed that mc and me are defined as mc=T1'/T1, and me=T2'/T2. In the case where the frequency of the signal is thus changed, if and when the signal is of a musical tone signal, only the pitch of the tone changes even if the frequency thereof is uniformlly changed. However, the frequency of a voice signal of a human is changed, the signal becomes less intelligible depending on the extent of change of the frequency. The reason is that a major portion of voice information is included in the said spectrum structure. In particular, in the case where compression and expansion of a voice are repeated at an appropriate speed, as in this particular case, a sufficient privacy communication effect can be attained even with 1/mc=me=1.5 to 0.7.

A control circuit 11 receiving the above described control signal from the transmitter makes an operation reverse to the operation of the above described transmitter 1 and serves to expand by 1/mc the voice signal piece previously subjected to the time base compression (T1') and to compress by 1/me the voice signal piece previously subjected to the time base expansion (T2'). The control signal may comprise a pilot signal lying outside a communication band, for example, and may be that which is obtained by modulating the amplitude of the pilot signal responsive to a control timing. It is a matter of course that the control signal may be superimposed on a voice signal or may be separately transmitted in the case where a communication channel is separately provided.

Figure 5:
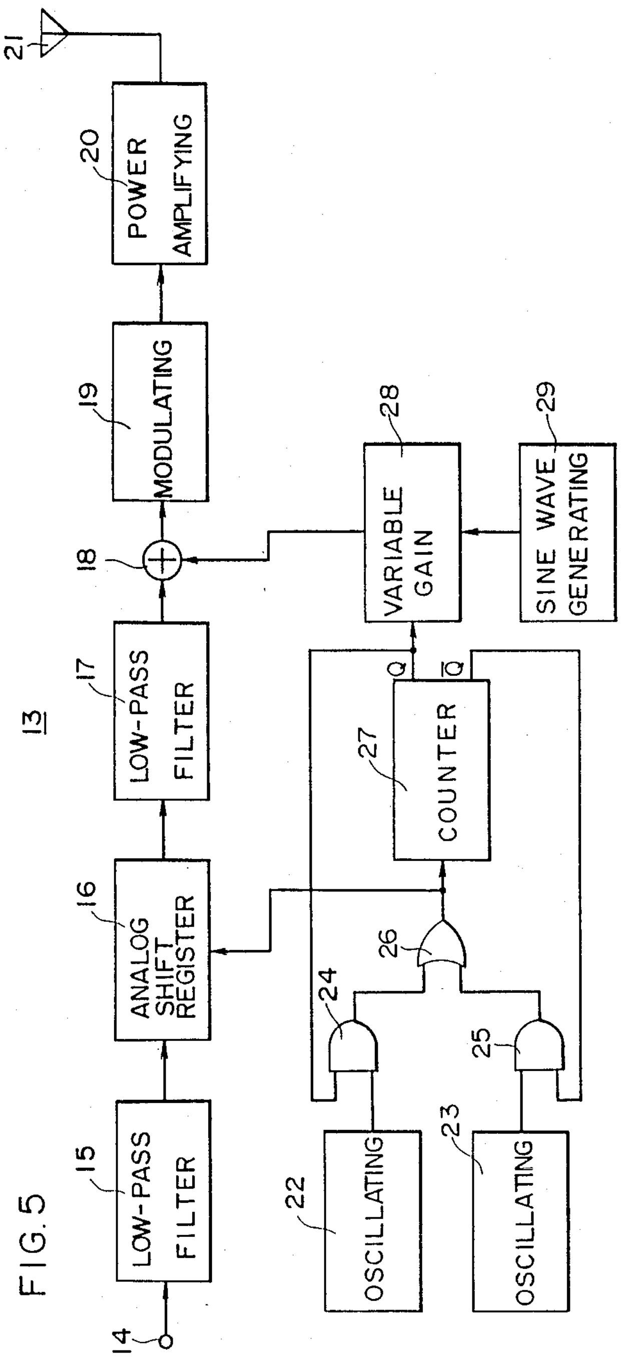
FIG. 5 is a block diagram showing more specifically the transmitter included in one embodiment of the present invention.
Figure 6:
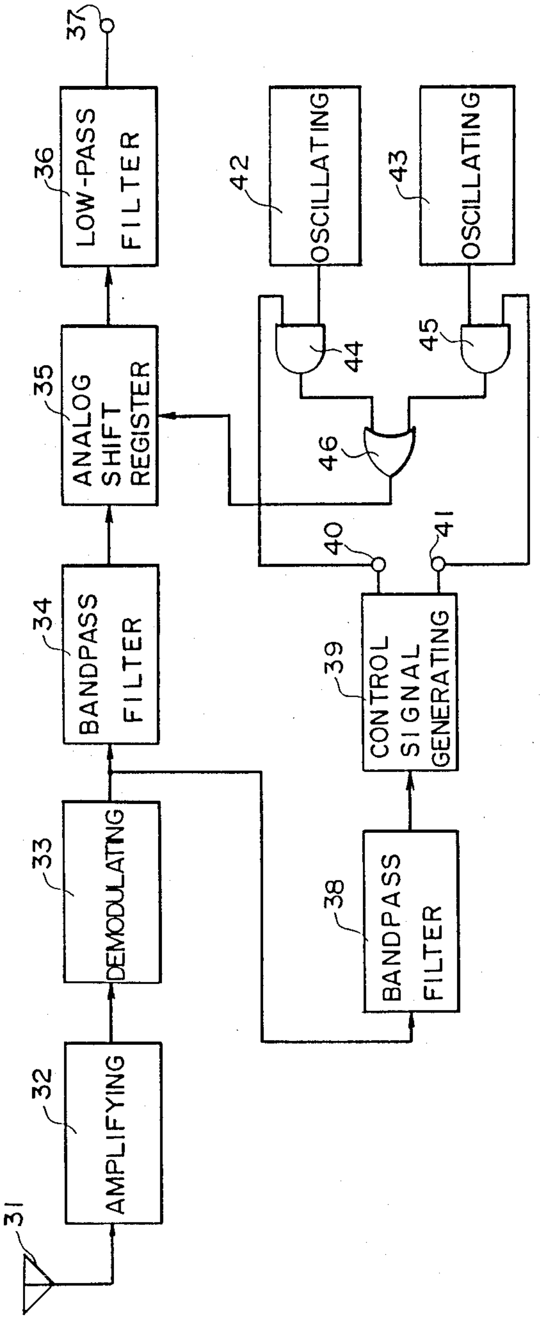
FIG. 6 is a block diagram showing more specifically the receiver included in one embodiment of the present invention.

FIG. 5 is a block diagram showing the transmitter included in one embodiment of the present invention in the case that f(t) is rectangular wave and FIG. 6 is a block diagram specifically showing the receiver included in one embodiment of the present invention.

First referring to FIG. 5, the structure of the transmitter 13 will be described. A voice input signal is supplied to the input terminal 14. The inputted voice signal is supplied through a low-pass filter 15 to an analog shift register 16. The analog shift register 16 serves to sample the inputted signal in response to a clock pulse, thereby to transfer the same in succession to output the same, and the register may comprise a charge coupled device such as a backet brigade device, for example. An oscillating circuit 22 serves to generate a clock pulse of the frequency f1 and an oscillating circuit 23 serves to generate a clock pulse of the frequency f2. The clock pulse from the oscillating circuit 22 is supplied to one input of an AND gate 24 and the clock pulse from the other oscillating circuit 23 is supplied to one input of an AND gate 25. The other input terminal of the AND gate 24 is connected to receive the output Q of a counter 27 to be described subsequently and the other input of the AND gate 25 is connected to receive an output $\overline{Q}$ of the same counter 27. The output from the AND gates 24 and 25 are supplied through an OR gate 26 to the counter 27 and is also applied to the analog shift register 16. The counter 27 has the outputs Q and $\overline{Q}$ alternately reversed each time the same counts the clock pulses of the number N obtained from the OR gate 26. Accordingly, as the outputs Q and $\overline{Q}$ of the counter 27 are alternately reversed, the AND gates 24 and 25 provide alternately the clock pulses from the oscillating circuits 22 and 23 to the analog shift register 16.

A sine wave generating circuit 29 serves to generate a pure sine wave of a constant amplitude and having the oscillation frequency fp. The output from the sine wave generating circuit 29 is supplied to a variable gain circuit 28. The variable gain circuit 28 is controlled by the output Q of the counter 27. More specifically, the variable gain circuit 28 serves to amplitude modulate the amplitude value of the sine wave to the value H when the output Q of the counter 27 is the logic "one" and to amplitude modulate the amplitude value of the sine wave to the value H' smaller than the previous value (normally H' is smaller than H by −6 to −10 dB) when the output Q of the counter 27 is the logic "zero". These amplitude modulated signals are supplied to a summing circuit 18 as a pilot signal for controlling the exchanging timing to exchange compression and expansion of the signal alternately. The summing circuit 18 serves to superimpose the pilot signal on the outputs from the above described analog shift register 16 and the low-pass filter 17 connected in series therewith. The frequency fp of the pilot signal is selected to be 6 to 8 kHz outside the voice signal band (say 200 to 3,800 Hz). The output of the summing circuit 18 is transmitted through the modulating circuit 19 and the power amplifying circuit 20 from the transmitting antenna 21.

Now the operation of the transmitter 13 will be described. The voice signal inputted through the input terminal 14 to the low-pass filter 15 undergoes removal of a folded noise which is unavoidably caused in this type of sampling circuit, whereupon the output is supplied to the analog shift register 16. The analog shift register 16 serves to sample the inputted voice signal in response to the clock pulse of the frequency f1 and the clock pulse of the frequency f2 alternately exchanged responsive to the outputs Q and $\overline{Q}$ of the counter 27, thereby to store the sampled output.

Assuming that f1/f2=m (>1), then if and when the output Q of the counter 27 is the logic "one" and the AND gate 24 is enabled, the analog shift register 16 samples the inputted voice signal in response to the clock pulse of the frequency f1, thereby to store the N bits of the sampled output. If and when the output $\overline{Q}$ of the counter 27 becomes the logic "one", whereby the clock pulse of the frequency f2 is selected, then the analog shift register 16 serves to sequentially provide the above described stored N bits of sampled values to low-pass filter 17 in response to the clock pulse of the frequency f2 and at the same time to sample and store the inputted voice signal in response to the clock pulse of the frequency f2. Accordingly, during the period of $\overline{Q}=1$, the frequency of the inputted voice signal is provided with the frequency reduced to 1/m and during the subsequent period of Q=1 the frequency of the inputted voice signal is increased to m, while these are provided from the analog shift register 16. The signal provided from the analog shift register 16 is supplied to the low-pass filter 17, where a high frequency component of the signal is removed, whereupon the signal is supplied to the summing circuit 18. The summing circuit 18 serves to superimpose the pilot signal obtained from the variable gain circuit 28 onto the output from the analog shift register 16, whereupon the output is transmitted through the modulating circuit 19 and the power amplifying circuit 20 from the transmitting antenna 21.

Now referring to FIG. 6, the structure of the receiver 30 will be described. The signal transmitted from the transmitter 13 shown in FIG. 5 is received by the receiving antenna 31 and the received signal is supplied to the amplifying circuit 32. The amplifying circuit 32 serves to amplify the received signal and to supply the same to the demodulating circuit 33. The demodulating circuit 33 serves to demodulate the base band signal from the received signal. The base band signal is supplied to the band pass filters 34 and 38. The band pass filter 38 has the center frequency selected to be fp and serves to separate the pilot signal from the base band signal. The pilot signal separated by the band pass filter 38 is supplied to the control signal generating circuit 39. The control signal generating circuit 39 serves to shape the waveform of the pilot signal, thereby to provide the logic "one" at the terminal 40 for the input amplitude corresponding to the amplitude value H in the transmitter and to provide the logic "zero" at the terminal 40 for the input amplitude of −6 to −10 dB of the amplitude value H. An inversion of the output from the terminal 40 is obtained at the output 41. The signal obtained from the terminal 40 is supplied to one input of the AND gate 44 and the signal obtained from the terminal 41 is supplied to one input of the AND gate 45. The oscillating circuit 42 and 43 serve to generate the clock pulses of the frequency f1 or f2, in the same manner as that of the oscillating circuits 22 and 23, respectively, of the transmitter 13. The clock pulse of the frequency f1 obtained from the oscillating circuit 42 is supplied to the other input of the AND gate 44 and the clock pulse of the frequency f2 obtained from the oscillating circuit 43 is supplied to the other input of the AND gate 45. The outputs from the AND gates 44 and 45 are supplied through the OR gate 46 to the analog shift register 35.

The base band signal obtained from the above described demodulating circuit 33 is supplied through the band pass filter 34 to the analog shift register 35. The analog shift register 35 comprises N bits in the same manner as that of the analog shift register 16 included in the transmitter 13. The output from the analog shift register 35 is supplied through the low-pass filter 36 to the output terminal 37.

Now the operation of the receiver 30 will be described. The signal received by the receiving antenna 31 is amplified by the amplifying circuit 32 and is demodulated by the demodulating circuit 33, whereby the base band signal is obtained. The pilot signal is separated by the band pass filter 38 from the base band signal and is supplied to the control signal generating circuit 39. The control signal generating circuit 39 provides the signal of the logic "one" at the terminal 40 and provides the signal of the logic "zero" at the terminal 41 if and when the input amplitude corresponds to the amplitude value H. However, if and when the input amplitude is smaller by −6 to −10 dB than the amplitude value H, the control signal generating circuit 39 provides the signal of the logic "zero" at the terminal 40 and provides the signal of the logic "one" at the terminal 41. More specifically, the control signal generating circuit 39 provides at the output terminal 40 the signal of the same phase as that of the output Q of the N bit counter 27 of the transmitter 13 and also provides at the output terminal 41 the signal of the same phase as that of the output $\overline{Q}$ of the counter 27.

On the other hand, the base band signal is supplied through the band pass filter 34 to the analog shift register 35. The analog shift register 35 is controlled in response to the clock pulse of the frequency f1 or f2 in the same manner as that of the transmitter 13. More specifically, if and when the input amplitude of the pilot signal is the amplitude value H, the control signal generating circuit 39 enables the AND gate 44, thereby to provide the clock pulse of the frequency f1 from the oscillating circuit 42 to the analog shift register 35. On the other hand, if and when the input amplitude is smaller by −6 to −10 dB than the amplitude value H, the control signal generating circuit 39 enables the AND gate 45, thereby to provide the clock pulse of the frequency f2 from the oscillating circuit 43 to the analog shift register 35. Accordingly, the analog shift register 35 serves to compress by 1/m times the time base of the voice signal (which was obtained upon expansion by m times in terms of the time base by sampling the voice signal at the frequency f1 and by reading out the same at the frequency f2 with the analog shift register 16 of the transmitter 13) by sampling the expanded voice signal with the clock pulse of the frequency f2 and by reading out the same with the clock pulse of the frequency f1. The analog shift register 35 also expands by m times the time base of the voice signal (which was obtained upon compression by 1/m times by sampling the voice signal with the clock pulse of the frequency f2 and by reading out the same with the clock pulse of the frequency f1 in the transmitter 13) by sampling the compressed voice signal with the clock pulse of the frequency f1 and by reading out the same with the clock pulse of the frequency f2. As a result, the voice signal as compressed and expanded by the transmitter 13 is restored, in terms of the time base, by the analog shift register 35 of the receiver 30, whereby a normal frequency structure which is the same as that of the original voice signal is regained. The singal having the time base restored is obtained from the output terminal 37 through the low-pass filter 36.

Figure 7:
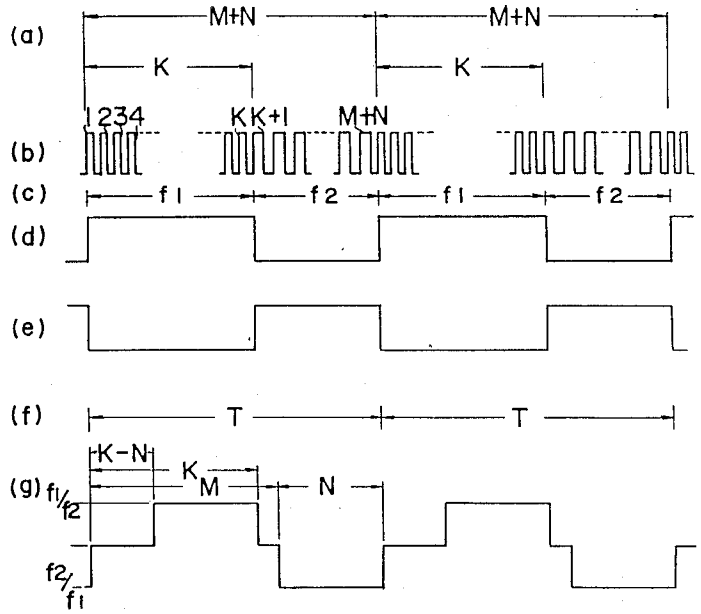
FIG. 7 is a graph showing waveforms for explaining the operation of another embodiment of the present invention.

FIG. 7 is a graph showing the waveforms for explaining the operation of the other embodiment of the present invention. FIG. 7 shows the waveforms of the signals in the case where the clock pulse of the transmitter 13 shown in FIG. 5 and the clock pulse of the receiver 30 shown in FIG. 6 have the respective frequencies with the periodicity or non-periodicity alotted. More specifically, the analog shift register 16 of the transmitter 13 shown in FIG. 5 is structured such that a plurality (M) of sampled values obtained in succession from those sampled and stored before M sampling time points may be always stored. The analog shift register 35 of the receiver 30 is structured such that the sampled values obtained from those sampled and stored before the N sampling time points may be stored in succession. Let it be assumed that the clock pulse of the transmitter 13 and the receiver 30 is of the frequency f(t) where, t is time, and the following periodicity and non-periodicity are established with respect to the frequency f(ti) of the clock at the sampling time point (ti), where i is an integer:

$$f(t_i)=f(t_{i+M+N}) \tag{4}$$

$$f(t_i)\neq f(t_{i+M}) \tag{5}$$

More specifically, since f(t) repeats the same clock frequency at every M+N clocks and, assuming that the repetition period is T, the above described equation (4) is expressed as follows:

$$f(t)=f(t+T) \tag{6}$$

while T and M+N may be coupled to each other by the following equation (7):

$$M+N=\int_{t}^{t+T} f(t)dt \tag{7}$$

The counter 27 of the transmitter 13 has the output Q rising each time the same counts the number of M+N of the clock pulses and has the output Q falling each time the number (K) of the clock pulses are counted, where K is an integer meeting the following:

$$K>M+N$$

The control signal is obtained at the terminals 40 and 41 of the control signal generating circuit 39 of the receiver 30 in synchronism with the outputs Q and $\overline{Q}$ of the counter 27 of the transmitter 13.

Referring to FIG. 7, (a) shows the number of clock pulses, (b) shows the clock pulses applied to the analog shift registers 16 and 35, (c) shows the frequency of the clock pulse, (d) shows the output Q of the counter 27 and the signal obtained at the terminal 40 of the control signal generating circuit 39, (e) shows the output $\overline{Q}$ of the counter 27 and the signal obtained at the terminal 41 of the control signal generating circuit 39, (f) shows the time period, and (g) shows a frequency conversion ratio.

Now referring to FIG. 7, the operation of the other embodiment of the present invention will be described. It is pointed out that the operation of the embodiment shown in FIG. 7 is the same as the description in conjunction with FIGS. 5 and 6 except for the following respects. More specifically, the frequency f(t) of the clock pulse for controlling the analog shift registers 16 and 35 is, as shown as (b) in FIG. 7, a cyclic function with the (M+N) clock as a cycle and satisfying the above described equation (1). Accordingly, the received voice output obtained from the output terminal 37 through the output side low-pass filter 36 of the analog shift register 35 of the receiver 30 is the same as the transmitted voice signal applied to the input terminal 14 shown in FIG. 5, as far as the frequency is concerned. However, in a situation where the signal is obtained from the analog shift register 16 of the transmitter 13 and the signal is on a wireless communication path constituting a transmission system, assuming that M>K>N, and further assuming that the time point where the output Q of the output counter 27 of the transmitter 13 rises is a reference of the sampling point, i. e. (t1), then the following is attained:

(1) The period of $t_1$ to $t_{K-N}$

The data sampled before for these clock pulses of the number M is sampled by the number (K−N) and is outputted. Since the frequency of the clock pulse of the sampled data is f1, the frequency conversion ratio during this period is f1/f1=1, i.e., there is no change.

(2) The period of $t_{K-N+1}$ to $t_K$

Although the frequency of the clock pulse is f1, since the sampled data has been sampled with the frequency f2, the frequency convertion ratio is f1/f2.

(3) The period of $t_{K+1}$ to $t_M$

Since the frequency of the clock pulse is f2 and the frequency of the clock pulse of the sampled data is f2, the frequency convertion ratio is f2/f2=1.

(4) The period of $t_{M+1}$ to $t_{M+N}$

Since the frequency of the clock pulse is f2 and the sampling frequency of the sampled data is f1, the frequency convertion ratio is f2/f1.

The above described relation is diagrammatically shown as (g) in FIG. 7, where it is assumed that f1>f2. Due to the above described frequency processing, the information can not be understood, even if the signal is directly received on the transmission system. Referring to the delay time of the voice signal in employing the above described embodiment, assuming a practical case of most simplicity of M=N=K and assuming f1=15 kHz, f2=10 kHz, and M=N=256, then the total delay amount of the voice signal is $(256/15)\times 10^{-3}+(256/10)\times 10^{-3}=43$ m sec. Thus, it would be appreciated that such involves no practical problem.

Now description will be made of an embodiment in the case where a random-access memory is employed as the variable delay circuits in the structure of the present invention shown in FIGS. 3A and 3B. In the case where the random-access memory is employed, the voice signal is sampled by the analog/digital converter in response to the sampling clock pulse and at the same time the sampled signal is digital coded and stored, whereupon the same is read out in response to the output clock pulse and is then converted to the analog signal by means of the digital/analog converter. In such a case, as for the clock control on the part of the transmitter end and the receiver end, it is required that the input clock f (t) on the part of the transmitter end and the output clock f $(t+\tau 1+\tau 2)$ on the part of the receiver end. after the lapse of the respective delay times $\tau 1$ and $\tau 2$ caused from passage of the voice signal through these storage circuits are kept to be equal to each other as seen in the equation (1). To that end, selection is made to meet the following equations, assuming that the frequencies of the input and output clocks of the random-access memory on the part of the transmitter end are $f_1$ and $f_2$ and the frequencies of the input and output clocks of the random-access memory on the part of the receiver end are $f_3$ and $f_4$:

$$f_1=f_4$$

$$f_2=f_3$$

the foregoing is appropriate in the case where such memories are employed as storage circuits. Specifically, it is more preferred to select $f_1$ and $f_4$ as $$f_1=f_4=\text{constant}$$

and to adapt $f_2$ *and* $f_3$ to be as synchronized variable clocks, in which case the clock function f (t) may be similarly selected to be an arbitrary one.

Figure 8:
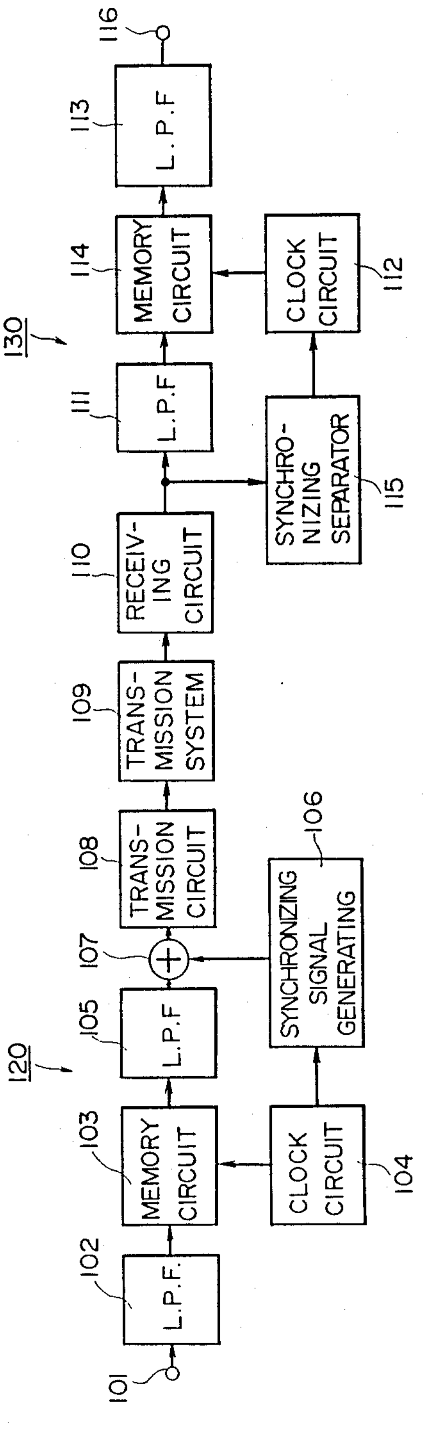
FIG. 8 is a block diagram for explaining an embodiment based on the above described principle.

FIG. 8 is a block diagram for explaining an embodiment based on the above described principle. The privacy communication apparatus shown in FIG. 8 comprises a transmitter end 120 and a receiver end 130. The voice signal inputted to a voice input terminal 101 is supplied through a low-pass filter 102 to a memory circuit 103. The memory circuit 103 serves to sample and store the voice signal in response to the clock pulse obtained from the clock circuit 104 and always stores the sampled values of the number M successively providing the sampled values stored by sampling the voice signal before the M sampling time points. The output of the memory circuit 103 is supplied through a low-pass filter 105 to a summing circuit 107. The summing circuit 107 makes summation of the output from a synchronizing signal circuit 6 to be described subsequently and the output from the memory circuit 103, to provide the output through a transmission circuit 108 for making modulation and amplification for transmission to a transmission system 109.

On the other hand, the receiver end 130 serves to demodulate the received signal obtained through the above described transmission system 109 by means of the receiving circuit 110 including an amplifying and demodulating circuit. The demodulated output is supplied through the low-pass filter 111 to the memory circuit 114. The memory circuit 114 samples the received voice signal in response to the clock pulse obtained from clock circuit 112 and stores the sampled signal and also provides in succession through the low-pass filter 113 the stored values as sampled and stored before the N sampling time point.

The clock pulses obtained from the clock circuit 104 of the transmitter end 120 and the clock circuit 112 of the receiver end 130 both have the frequency f (t), where t is the time, and have the periodicity and non-periodicity of the described equations (4) to (7) as to the frequency f $(t_i)$, where i is an integer, of the clock pulses at the sampling time point $(t_i)$.

Synchronization between the transmitter end and the receiver end is performed by a synchronizing separator circuit 115 for separating from the received signal a synchronizing signal transmitted from the synchronizing signal generating circuit 106 of the transmitter end so that the clock pulse of the receiver end 130 may be completely synchronized with the clock pulse of the transmitter end 120.

As described in the foregoing, according to the structure of the embodiment in description, the memory circuit 103 of the transmitter end 120 and the memory circuit 114 of the receiver end 130 are controlled superficially by the same clock pulse (t) and, in the absence of factor of time delay in the transmission system 109, the voice signal sampled at an arbitrary timing and supplied to the input terminal 101 is obtained at the output terminal 116 of the receiver end 130 after the (M+N) clcck pulse or after the lapse of T second. At that time, as shown by the previous equations (1) and (3), the sampling clock pulse and the output clock pulse are always in the same relation. Therefore, irrespective of what function the clock frequency f (t) is, if and when the minimum clock frequency (fmin) is more than at least two times of a transmission voice signal band, i.e. the sampling theorem is met, there is no frequency change between the input and output terminals and hence the voice is restored with a mere time delay (T). However, in such a state which the voice signal supplied to the input terminal 101 is sampled and stored in the memory circuit 103 and the same is transferred to the transmission system 109, the input and output clock pulses are not necessarily consistent with each other, as shown by the equation (2) and, therefore, the voice frequency on the transmission system changes with the ratio of f $(t_{i+M})$/f $(t_i)$. As a result, a sufficient privacy effect can be attained even by the embodiment shown in FIG. 8.

Figure 9:
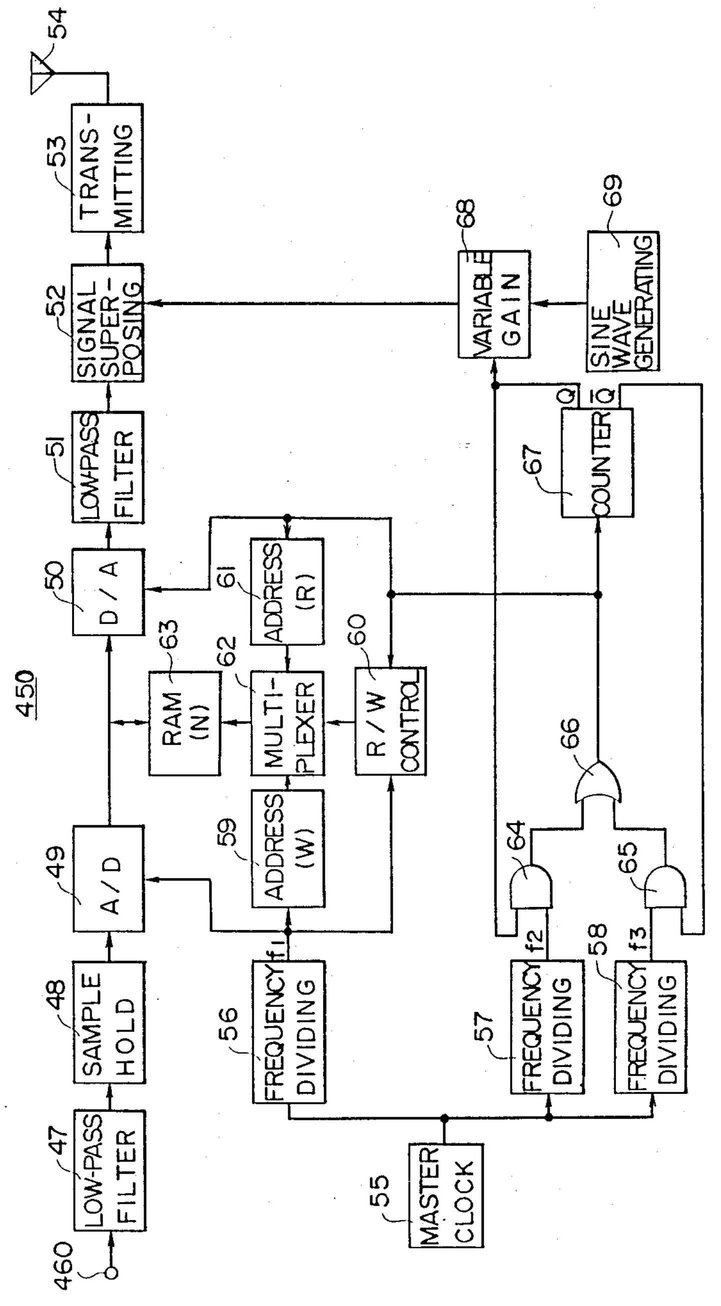
FIG. 9 is block diagram showing an outline of a transmitter included in another embodiment of the present invention.
Figure 10:
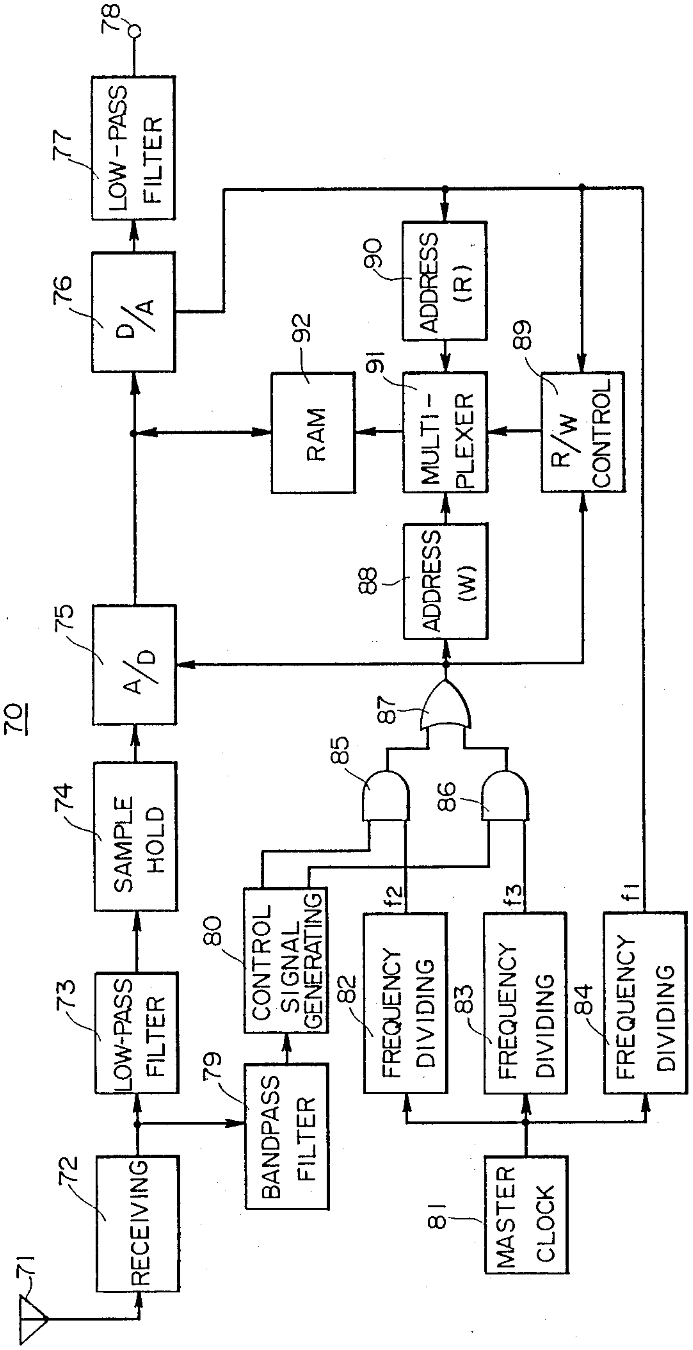
FIG. 10 is a block diagram showing an outline of a receiver included in another embodiment of the present invention.

FIGS. 9 and 10 show an embodiment in which f(t) is selected either the frequency f1 or f2 as the simplest case, i.e. a rectangular wave function is employed, and particularly FIG. 9 is a block diagram showing specifically the transmitter and FIG. 10 is a block diagram showing specifically the receiver.

First referring to FIG. 9, the structure of the transmitter 450 will be described. The transmitter 450 shown in FIG. 9 comprises a random access memory 63 employed in place of the analog shift registers described in conjunction with FIGS. 3A and 5. More specifically, the signal applied to the input terminal 460 is applied through the low-pass filter 47 and the sample hold circuit 48 to the analog/digital converting circuit 49. The analog/digital converting circuit 49 samples the inputted analog signal and converts the sampled signal to a digital signal in response to the clock pulse of the frequency f1 obtained from a frequency dividing circuit 56 to be described subsequently. The digital signal thus obtained is supplied to the random access memory 63. The random access memory 63 comprises N bits and the write addresses of the same are designated in response to the addressing signal obtained through the multiplexer 62 from the write address circuit 59. The address circuit 59 comprises a counter for counting the clock pulses of the frequency f1 obtained from the frequency dividing circuit 56.

The master oscillating circuit 55 serves to generate a master clock pulse of the frequency f0, which is supplied to the frequency dividing circuits 56 to 58. The frequency dividing circuit 56 frequency divides the master clock pulses at the frequency division ratio Ml, thereby to make frequency division to the frequency f1=f0/M1. The frequency dividing circuit 57 frequency divides the master clock pulse at the frequency division ratio M2, thereby to provide the clock pulse of the frequency f2=f0/M2. The frequency dividing circuit 58 frequency divides the master clock pulses at the frequency division ratio M3, thereby to provide the clock pulses of the frequency f3=f0/M3. The clock pulse obtained from the frequency dividing circuit 57 is supplied to one input of the AND gate 64 and the clock pulse obtained from the frequency dividing circuit 58 is supplied to one input of the AND gate 65. The other input of the AND gate 64 is connected to receive the output Q of the counter 68 and the other input of the AND gate 65 is connected to receive the output $\overline{Q}$ of the counter 67. The respective outputs from the AND gates 64 and 65 are supplied through the OR gate 66 to the counter 67 and is also applied to the digital/analog converting circuit 50, the read address circuit 61 and the read/write control circuit 60. The read address circuit 61 comprises a counter for counting the clock pulses obtained from the OR gate 66 and the count value in the counter is supplied through the multiplexer 62 to the random access memory 63 as an addressing signal. As the random access memory 63 is addressed by the read address circuit 61, the digital signal so far stored is read out and the same is supplied to the digital/analog converting circuit 50. The digital/analog converting circuit 50 serves to convert the inputted digital signal into an analog signal in accordance with the output from the previously described OR gate 66. The analog signal is supplied through the low-pass filter 51 and; the synchronizing signal superposing circuit 52 to the transmission circuit 53 and is transmitted from the transmitting antenna 54. Meanwhile, as is similar to FIG. 5, the synchronizing signal superposing circuit 52 is supplied with a synchronizing signal obtained from the synchronizing signal generating circuit including a sine wave generating circuit 69 and a variable gain circuit 68.

Now the operation of the transmitter 450 will be described. The write addressing circuit 59 and the read addressing circuit 61 each including an N-bit counter, and the counter 67 are all reset simultaneously at the start of the operation of the circuit. Then the respective frequency division ratios M1, M2 and M3 of the frequency dividing circuits 56, 57 and 78 are determined as follows:

$$M1=(M2+M3)/2\ (M2\neq M3) \quad (8)$$

Assuming as described above and by substituting the following in the equation (8), $$f1=f0/M1 \quad (9)$$

$$f2=f0/M2 \quad (10)$$

$$f3=f0/M3 \quad (11)$$

then the following equation is obtained.

$$\frac{N}{2}\cdot\frac{1}{f2}+\frac{N}{2}\cdot\frac{1}{f3}=N\cdot\frac{1}{f1} \quad (12)$$

More specifically, by the above described equation (12) whereas the write operation is performed at the cycle N·1/f1 for the random access memory 63 with the constant clock pulse (f1), the read out operation is repeated every period N/2 of the clock pulses (f2) and (f3). Since the equation (12) is met for the respective clock times N/2·1/f2, N/2·1/f3, the write and read operation of the random access memory 63 of the storage capacity of N words is completely and cyclicly performed for every N clocks. It follows that the frequencies of the voice signal read out from the random access memory 63 within the period changes alternately among f2/f1 and f3/f1. For example, assuming that the above described frequency division ratios M1, M2, M3 are determined as follows to meet the equation (8):

$$M1=2M\ (M\text{: a positive integer}) \quad (13)$$

$$M2=3M \quad (14)$$

$$M3=M \quad (15)$$

then transmission is made in such a way that the frequency of the voice signal is changed to f2/f1=M1/M2=⅔ times for M/2 clock at the beginning and to f3/f1=M1/M3=2 times for the remaining N/2 clocks.

Now referring to FIG. 10, the structure of the receiver 70 will be described. The signal transmitted from the transmitter 450 is received by the receiving circuit 72 through the receiving antenna 71 of the receiver 70. The base band signal is obtained from the receiving circuit 72 as a received output and the synchronizing signal is separated therefrom by the band pass filter 79. The control signal generating circuit 80 is responsive to the synchronizing signal separated by the band pass filter 79 to provide a control singal, which is applied to one input of each of the AND gates 85 and 86.

A master clock pulse of the frequency f0 is generated from the master clock pulse generating circuit 81 in the same manner as that of the master clock pulse generating circuit 55 of the transmitter 450 and is supplied to the frequency dividing circuits 82 to 84. The frequency dividing circuits 82 to 84 frequency divide the master clock pulse at the respective frequency division ratios M2, M3 and M1, thereby to provide the clock pulse of the frequency f2, the clock pulse of the frequency f3 and the clock pulse of the frequency f1, respectively. The clock pulse of the frequency f2 is supplied to the other input of the AND gate 85 and the clock pulse of the frequency f3 is supplied to the other input of the AND gate 86. The outputs from the AND gates 85 and 86 are supplied through the OR gate 87 to the analog/digital converting circuit 75, the write address circuit 88 and the read/write control circuit 89. The write address circuit 88 comprises a counter for counting the output from the OR gate 87, the output of which is supplied through the multiplexer 91 to the random access memory 92 as a write address signal. The clock pulse of the frequency f1 obtained from the frequency dividing circuit 84 is supplied to the read/write control circuit 89, the read address circuit 90 and the digital/analog converting circuit 76. The read address circuit 90 counts the clock pulses and the count output is supplied through the multiplexer 91 to the random access memory 92 as a read out address signal.

On the other hand, the received signal obtained from the receiving circuit 72 is supplied through the low-pass filter 73 and the sample hold circuit 74 to the analog/digital converting circuit 75. The analog/digital converting circuit 75 is responsive to the clock pulse obtained from the OR gate 87 to convert the analog signal as received to a digital signal and the digital signal thus obtained is supplied to the random access memory 92. The output from the analog/digital converting circuit 75 is written in the random access memory 92 in response to a write address signal obtained from the write address circuit 88 through the multiplexer 91. The stored signal in the random access memory 92 is read out in accordance with the read address signal obtained from the read address circuit 90 through the multiplexer 91 and the read output is supplied to the digital/analog converting circuit 76. The digital/analog converting circuit 76 serves to convert the digital signal read out from the random access memory 92 into an analog signal in response to the clock pulse obtained from the frequency dividing circuit 84 and the analog output signal is obtained through the low-pass filter 77 at the output terminal 78.

Now the operation of the receiver 70 will be described. The signal transmitted from the transmitter 450 is received through the receiving antenna 71 by the receiving circuit 72. The band-pass filter 79 separates the synchronizing signal from the base band signal obtained from the receiving circuit 72 and the control signal generating circuit 80 serves to make selection of either the AND gate 85 or 86 in response to the synchronizing signal. As a result, the clock pulse of the frequency f2 or the frequency f3 is obtained from the frequency dividing circuit 82 or 83 through the OR gate 87. The write address circuit 88 counts the clock pulse obtained from the OR gate 87, thereby to designate the write address of the random access memory 92 through the multiplexer 91. The analog/digital converting circuit 75 samples the analog signal inputted from the receiving circuit 72 through the low-pass filter 73 and the sample hold circuit 74, thereby to write the digital signal in the designated address of the random access memory 92. The digital signal written in the random access memory 92 is read out in response to the read address signal obtained from the read address circuit 90 through the multiplexer 91. The digital/analog converting circuit 76 restores the original analog signal in response to the clock pulse of the frequency f1 obtained from the frequency dividing circuit 84 and the original analog signal thus obtained is provided to the output terminal 78 through the low-pass filter 77.

Meanwhile, the write address circuit 88 and the read address circuit 90 of the receiver 70 are reset in response to the rise of the output $\overline{Q}$ of the control signal generating circuit 80, whereby the write address of the random access memory 63 of the transmitter 450 and the read address of the random access memory 92 of the receiver 70 always coincide with each other. As a result, the delay time which it takes for the voice signal to enter into the input terminal 460 of the transmitter 450 and go out from the output terminal 78 of the receiver 70 becomes N/f1. For example, assuming that N=512 and f3=20 kHz, then the delay time is 25.6 m sec, which is a value of little practical problem.

Figure 11:
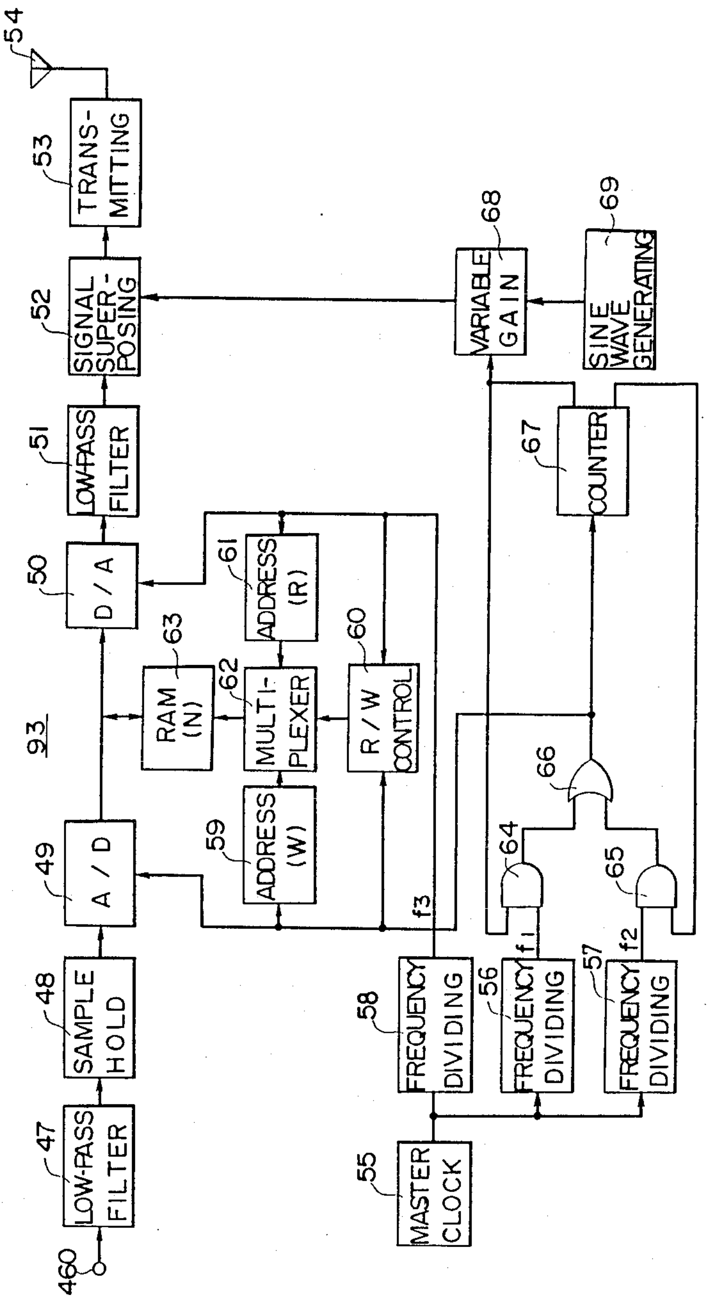
FIG. 11 is a block diagram showing an outline of a transmitter included in a further embodiment of the present invention.
Figure 12:
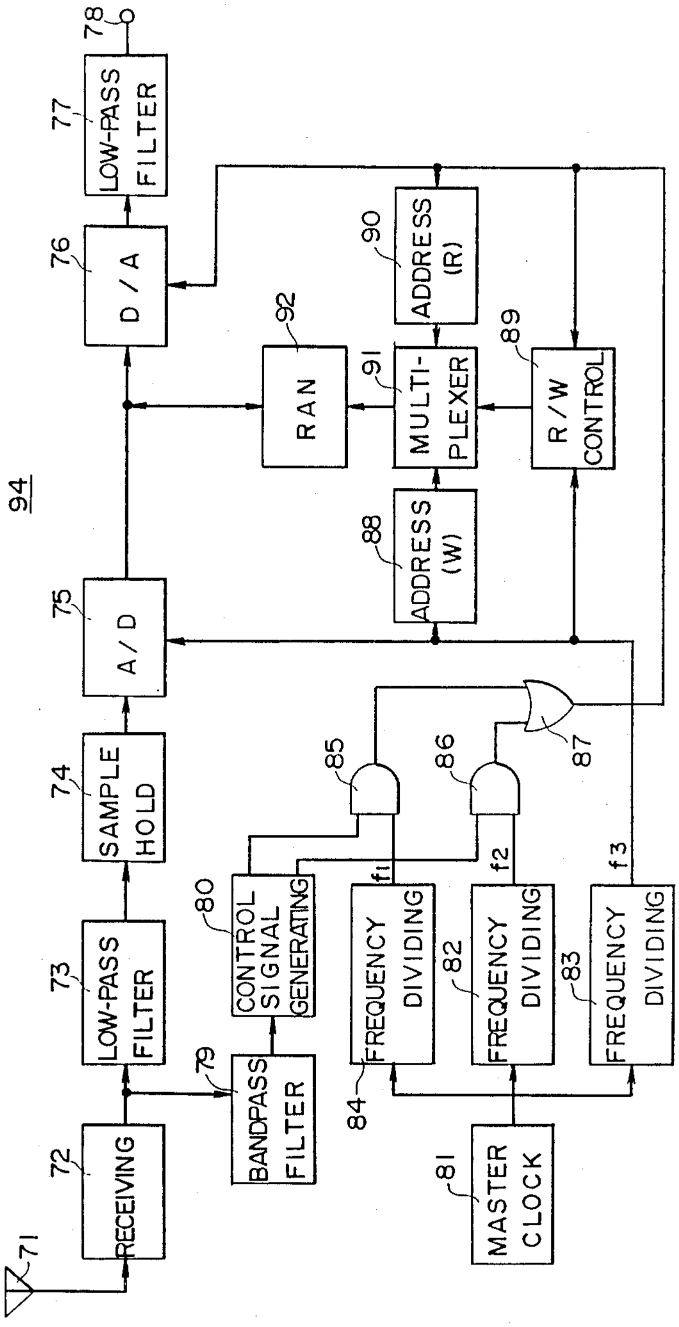
FIG. 12 is a block diagram showing an outline of a receiver included in a further embodiment of the present invention.

FIG. 11 is a block diagram showing in more detail the transmitter included in the other embodiment of the present invention and FIG. 12 is a block diagram showing in more detail the receiver included in the other embodiment of the present invention.

The embodiments shown in FIGS. 11 and 12 are substantially the same as those shown in FIGS. 9 and 10, except for the following respects. More specifically, the transmitter 450 shown in FIG. 9 was adapted such that the sampling was made in response to the clock pulse of the frequency f1 and the reading out is made in response to the clock pulse of the frequency f2 or f3 and the receiver 70 shown in FIG. 10 was adapted such that the sampling is made in response to the clock pulse of the frequency f2 or f3 and the reading out is made in response to the clock pulse of the frequency f1. However, the transmitter 93 shown in FIG. 11 is adapted such that the sampling is made in response to the clock pulse of the frequency f1 or f2 and the reading out is made in response to the clock pulse of the frequency f3 and the receiver 94 shown in FIG. 12 is adapted such that the sampling is made in response to the clock pulse of the frequency f3 and the reading out is made as in response to the clock pulse of the frequency f1 or f2. In this case, the respective frequency division ratios M1, M2 and M3 of the frequency dividing circuits 56, 57 and 58 are selected to meet the following equation:

$$M3=(M1+M2)/2\ (M1\neq M2) \tag{16}$$

By doing so, and by substituting the following in the equation (16), $$f1=f0/M1 \tag{17}$$

$$f2=f0/M2 \tag{18}$$

$$f3=f0/M3 \tag{19}$$

the following equation (20) is obtained.

$$N/2\cdot 1/f1+N/2\cdot 1/f2=N\cdot 1/f3 \tag{20}$$

More specifically, as is clear from the equation (20), the reading out of the digital signal from the random access memory 63 is made in response to the clock pulse of the frequency f3 at the cycle N 1/f3. By contrast, the writing in of the signal into the random access memory 63 is made in response to the clock pulse of the frequency f1 or f2 which is repeated at each cycle of N/2; however, the equation (20) is met for each of the clock time N/2·1/f1 and N/2·1/f2. Therefore, the writing in and reading out from the random access memory 63 of the storage capacity of N words are performed completely and cyclically for every N clocks. The frequency of the voice signal read out from the random access memory 63 in that period alternately changes between f3/f1 and f3/f2. For example, the above described frequency division ratios M1, M2 and M3 are assumed to be the following $$M1=M\ (M\text{: an integer}) \tag{21}$$

$$M2=3M \tag{22}$$

$$M3=2M \tag{23}$$

so that the equation (16) may be met, then transmission is made for each period in such a way that the frequency of the voice signal is changed to f3/f1=M1/M3=½ times for the first N/2 clocks and f3/f2=M2/M3=1.5 times for the remaining N/2 clocks.

Therefore, in the transmitter 93 shown in FIG. 11, the clock pulse of the frequency f1 obtained from the frequency dividing circuit 56 is applied to one input of the AND gate 64 and the clock pulse of the frequency f2 obtained from the frequency dividing circuit 57 is applied to one input of the AND gate 65. The output from the OR gate 66 is supplied to the analog/digital converting circuit 49 and the analog signal is sampled in response to the clock pulse of the frequency f1 or f2. The clock pulse of the frequency f3 obtained from the frequency dividing circuit 58 is supplied to the digital/analog converting circuit 50, the read address circuit 61 and the read/write control circuit 60. The digital signal is read from the random access memory 63 in response to the clock pulse of the frequency f3. In the receiver 94 shown in FIG. 12, the clock pulse of the frequency f3 obtained from the frequency dividing circuit 83 is applied to the analog/digital converting circuit 75 and the analog signal sampled in response to the said clock pulse. The clock pulse of the frequency f1 obtained from the frequency dividing circuit 84 is supplied to one input of the AND gate 85 and the clock pulse of the frequency f2 obtained from the frequency dividing circuit 82 is supplied to one input of the AND gate 86. The output from the OR gate 87 is supplied to the digital/analog converting circuit 76, the read address circuit 90 and the read/write control circuit 89. Accordingly, the read address circuit 90 counts the clock pulse of the frequency f1 or f2, thereby to designate the read address of the random access memory 90 through the multiplexer 91.

Meanwhile, the write address circuit 88 and the read address circuit 90 of the receiver 94 are reset in response to the rise of the output $\overline{Q}$ of the control signal generating circuit 80, whereby the write address of the random access memory 63 of the transmitter 93 and the read address of the random access memory 92 of the receiver 94 always coincide with each other. As a result, the delay time which it takes for the voice signal to enter into the input terminal 460 of the transmitter 93 and go out from the output terminal 78 of the receiver 94 becomes N/f3. For example, assuming that N=512 and f3=20 kHz, then the delay time is 25.6 m sec, as mentioned in the foregoing.

As described in the foregoing, according to the embodiment described above, since the sampling frequency of the voice signal supplied to the input terminal 460 of the transmitter 93 and the output clock frequency of the output voice signal obtained from the output terminal 78 of the receiver 94 are equal to each other, the frequency of the voice signal passing through the system does not change. However, in a situation in which the voice signal is radiated into the air from the antenna 54 of the transmitter 93, the frequency of the voice signal becomes alternately f3/f1 or f3/f2. Accordingly, the information in communication cannot be understood by others, even if received by them.

As described in the foregoing, the embodiment shown in FIGS. 11 and 12 is characterized in that if and when the input and output clocks of the input and output circuits of the random access memory 63 of the transmitter 93 are Fl and F2 respectively and the input and output clocks of the random access memory 92 of the receiver 94 are F3 and F4 respectively, then F2=F3=f3=constant and Fl=F4=f1 or f2 (alternate for every N/2 clocks). The frequency conversion of such vcice signal can be realized in principle, as shown in FIGS. 9 and 10, by making a frequency (F1) of the sampling clock on the part of the transmitter end and a frequency (F4) of the read out clock on the part of the receiver end be always common constant value and by making a frequency (F2) of the read out clock on the part of the transmitter end and a frequency (F3) of the sampling clock on the part of the receiver end be variable in synchronism. Assuming that such system is referred to as a transmission clock varying system and the system employed in the embodiment shown in FIGS. 11 and 12 is referred to as a sampling clock varying system, then the information stored in the memory circuit on the part of both the transmitter end and the receiver end is different in the transmission clock varying system. In other words, the information on the part of the receiver end is that which was obtained through frequency connection as compared with the information on the part of the transmitter end in accordance with the transmission clock varying system, while in the sampling clock varying system of the embodiment shown in FIGS. 11 and 12 the information stored in the memory circuit on the part of both the transmitter end and the receiver end is the same as each other, provided that there is a delay time. Accordingly, in the transmission clock varying system it is necessary to establish a complete synchronizing relation between the transmitter and the receiver end, while in the sampling clock varying system employed in the embodiment shown in FIGS. 11 and 12 necessity of establishing synchronization between the transmitter and receiver ends may be eliminated by adjusting the read out address on the part of the receiver end by monitoring the tone quality insofar as the repetition cycle of compression and expansion of the voice signal on the part of both the transmitter and receiver ends is the same.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A privacy communication apparatus comprising:

transmitter means for transmitting a signal and for either only compressing or only expanding the time base of said signal during alternate successive predefined time segments thereof, said transmitter means including transmission clock pulse generating means for generating clock pulses and transmission signal variable delaying means responsive to said clock pulses for performing said alternate compression and expansion of said time base of said signal to be transmitted; and receiving means for receiving and demodulating said signal transmitted from said transmitting means and for either only expanding or only compressing the time base of said received signal during said alternate time segments that were subject, respectively, to said compression and expansion by said transmitting means, said receiving means including reception clock pulse generating means for generating clock pulses and reception signal variable delaying means responsive to said clock pulses from said reception clock pulse generating means to be controlled for performing said alternate expansion and compression of the time base of said received signal;

wherein said transmission signal and reception signal variable delaying means each provide a delay of one time segment, so that input signal portions occurring during a compressed time segment are expanded to fill the next expanded time segment and input signal portions occurring during an expanded time segment are compressed to fill the next compressed time segment, whereby a signal is restored to its original condition after passing through both the transmission signal and reception signal variable delaying means.

2. A privacy communication apparatus in accordance with claim 1, wherein one of said transmitting means and said receiving means further comprises means for deriving a synchronizing signal and means for controlling at least one of said transmission clock pulse generating means and said reception clock pulse generating means in response to the derived synchronizing signal and for performing synchronization of the clock pulse on the part of the transmitter end and the clock pulse on the part of the receiver end generated by said respective clock pulse generating means.

3. A privacy communication apparatus in accordance with claim 2, wherein the frequency of the clock pulse generated by said transmission clock pulses generating means and the clock pulse generated by said reception clock pulse generating means in synchronism therewith are selected to be a clock function satisfying $$f(t_i)=f(t_{i+M+N})$$

$$f(t_i)\neq f(t_{i+M})$$

(where ≠ means "not always equal to") assuming that the frequency of the clock pulse is $f(t_i)$, where $t_i$ is the sampling time and i is the sampling point, and the storage capacities of the respective shift registers of the transmitter end and the receiver end are M and N (integers).

4. A privacy communication apparatus in accordance with claim 3, wherein said transmission clock pulse generating means and said reception clock pulse generating means each comprise first clock pulse generating means for generating a first clock pulse, and second clock pulse generating means for generating a second clock pulse of the frequency different from that of said first clock pulse, and said transmission signal storage means and reception signal storage means each comprise a transmission shift register and a reception shift register for storing, transferring and providing the input signal alternately in response to said first or second clock pulse obtained from said first or second clock pulse generating means.

5. A privacy communication apparatus in accordance with claim 3, wherein the frequency $F_1$ of said clock pulse on the part of said transmitter end and the frequency $F_4$ of said clock pulse on the part of said receiver end are equal to each other and of a constant frequency, and the frequency $F_2$ of said clock pulse on the part of said transmitter end and the frequency $F_3$ of said clock pulse on the part of said receiver end are selected to be equal to each other and to be variable with time.

6. A privacy communication apparatus in accordance with claim 3, wherein the frequency $F_2$ of said clock pulse of said transmitter end and the frequency $F_3$ of said clock pulse of said receiver end are selected to be equal to each other and to be of a constant frequency, and the frequency $F_1$ of said clock pulse of said transmitter end and the frequency $F_4$ of said clock pulse of said receiver end are selected to be equal to each other and to be variable with time.

7. A privacy communication apparatus comprising:

transmitter means for transmitting a signal and for either only compressing or only expanding the time base of said signal during alternate successive predefined time segments thereof, said transmitter means including transmission clock pulse generating means for generating clock pulses and transmission signal variable delaying means responsive to said clock pulses for performing said alternate compression and expansion of said time base of said signal to be transmitted; and receiving means for receiving and demodulating said signal transmitted from said transmitting means and for either only expanding or only compressing the time base of said received signal during said alternate time segments that were subjected, respectively, to said compression and expansion by said transmitting means, said receiving means including reception clock pulse generating means for generating clock pulses and reception signal variable delaying means responsive to said clock pulses from said reception clock pulse generating means to be controlled for performing said alternate expansion and compression of the time base of said received signal;

wherein said transmission signal variably delaying means and said reception signal variable delaying means each comprise signal storing means for sampling the signal in response to the clock pulses obtained from said transmission clock pulse generating means and said reception clock pulse generating means, for storing a sampled value of a signal applied thereto and for providing the stored data as an output, said signal storage means comprising a shift register for sampling in succession the signal in response to clock pulses obtained from one of said transmission clock pulse generating means and said reception clock pulsel generating means, for storing the sampled values of the signal during each time segment and for simultaneously transferring data stored during the previous time segment and providing said transferred data as an output after transfer, whereby data stored during a compressed segment is outputted during an expanded segment and the data stored during an expanded segment is outputted during a compressed segment.

8. In a privacy communicaiton apparatus comprising a transmitter and a receiver:

means for generating a time base signal composed of alternate either only compressed or only expanded time segments, with a compressed and an expanded time segment each being of predetermined duration;

transmission delay means in said transmitter acting on a signal to be transmitted and responsive to said time base signal for delaying the portion of said signal occurring during any time segment so that it fills the immediately following time segment, whereby signal portions occurring during compressed segments are expanded to fill the immediately following expanded segment, and signal portions occurring during expanded segments are compressed to fill the immediately following compressed segment; and reception delay means in said receiver acting on a received signal received from said transmitter and responsive to said time base signal for delaying portions of said received signal occurring during any time segment so that it fills the immediately following time segment, whereby received signal portions occurring during compressed segments are expanded to fill the immediately following expanded segment, and signal portions occurring during expanded segments are compressed to fill the immediately following compressed segment.

9. A privacy communication apparatus in accordance with claim 8, further comprising means in said transmitter for combining with the signal from said transmission delay means information relating to said time base signal, thereby forming a composite signal for transmission; and means in said receiver for extracting said time base information from said composite signal to reconstruct said time base signal for use in controlling said reception delay means.

* * * * *

UNITED STATES PATENT AND TRADEMARK OFFICE
CERTIFICATE OF CORRECTION

PATENT NO. : 4,742,546

DATED : May 3, 1988

INVENTOR(S) : Satoshi Nishimura

It is certified that error appears in the above-identified patent and that said Letters Patent are hereby corrected as shown below:

On the title page insert item [73] to read as follows:

-- Assignee: Sanyo Electric Co., Ltd., Osaka-Fu, Japan--.

Signed and Sealed this

Fourth Day of October, 1988

*Attest:*

DONALD J. QUIGG

*Attesting Officer*

*Commissioner of Patents and Trademarks*